United States Patent [19]

Nix et al.

[11] Patent Number: 4,750,878
[45] Date of Patent: Jun. 14, 1988

[54] RETAINER BUSHING

[75] Inventors: Richard A. Nix, Utica; David L. Wrobleski, Fraser; David C. Barker, Oak Park, all of Mich.

[73] Assignee: Automotive Products plc, Warwickshire, England

[21] Appl. No.: 860,520

[22] Filed: May 7, 1986

Related U.S. Application Data

[63] Continuation-in-part of Ser. No. 764,241, Aug. 9, 1985, Pat. No. 4,624,585, which is a continuation of Ser. No. 578,709, Feb. 9, 1984, abandoned.

[51] Int. Cl.$^4$ ............... F16B 33/04; F16B 33/22; F16B 35/02
[52] U.S. Cl. .................. 384/296; 384/295; 384/297; 384/439; 411/377; 411/509
[58] Field of Search ............ 384/296, 295, 297, 439; 411/377, 509, 508, 510, 352, 353; 24/621, 650

[56] References Cited

U.S. PATENT DOCUMENTS

| 2,976,345 | 3/1961 | Whitted | 411/508 X |
| 3,065,035 | 11/1962 | Biesecker | 384/296 |
| 3,139,768 | 7/1964 | Biesecker | 411/508 X |
| 3,299,737 | 1/1967 | Hurlin | 384/416 X |
| 3,415,155 | 12/1968 | Riddell et al. | 384/297 X |
| 3,481,655 | 12/1969 | Campbell | 384/536 |
| 4,407,125 | 10/1983 | Parsons | 60/584 |
| 4,624,585 | 11/1986 | Nix et al. | 384/297 X |

Primary Examiner—Stuart S. Levy
Assistant Examiner—Lynn M. Sohacki
Attorney, Agent, or Firm—Krass & Young

[57] ABSTRACT

A retainer bushing for connecting a male member such as a shaft, rod or pin, for example the coupling pin of a motor vehicle clutch pedal, to a mechanical component having a bore accepting the shaft, rod or pin in the bore, for example the input member of an hydraulic master cylinder hydraulically connected to a slave cylinder actuating a clutch release mechanism. The retainer bushing has a flange at one end and one or more longitudinally projecting tangs at the other end. A closure wall is integrally formed at the other end of the retainer bushing. Each tang, which is elastically deflectable outwardly and inwardly, has a radially inwardly directed abutment surface for engagement with the other end of the bore when the flange is engaged at one end thereof, and an inwardly radially directed prong for engagement in a peripheral groove formed in the pin. The bushing is introduced into the bore, with the tangs elastically deflected inwardly, until the tangs snap back to their original position with their abutment surface preventing removal of the bushing from the bore, and the tangs are elastically deflected outwardly when the pin is introduced through the bushing bore until each tang snaps back to its original position with its inwardly directed prong engaged in the pin peripheral groove. The closure wall prevents the pin from being introduced into the bushing through the wrong end.

9 Claims, 4 Drawing Sheets

FIG. 1
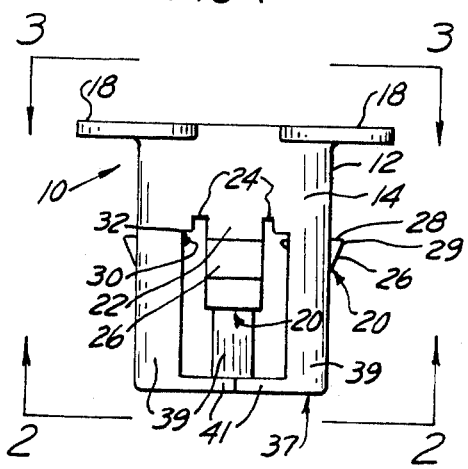
FIG. 2
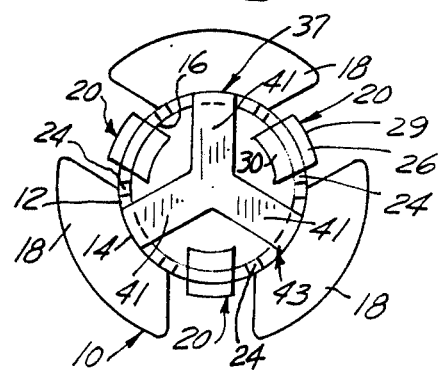
FIG. 4
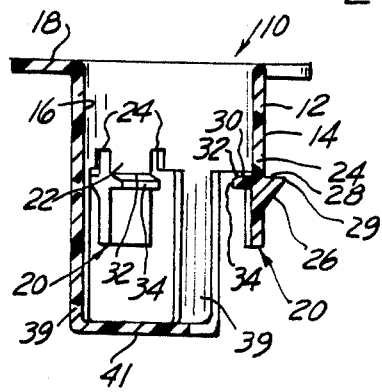
FIG. 3
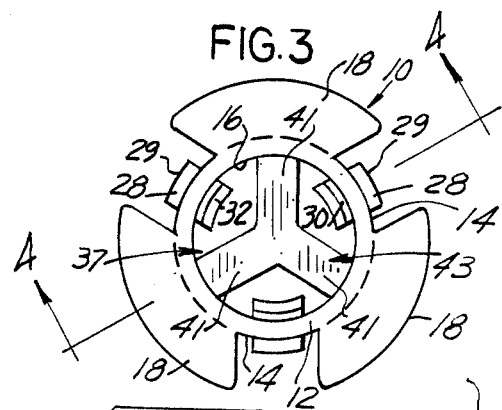
FIG. 5
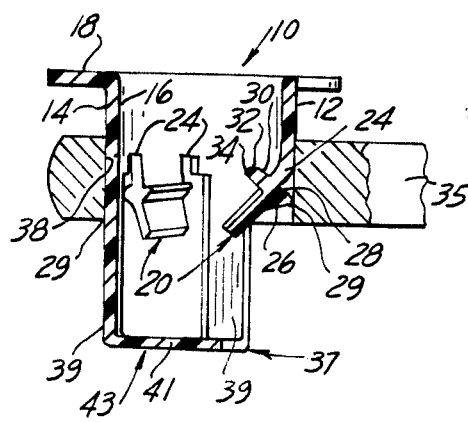
FIG. 6

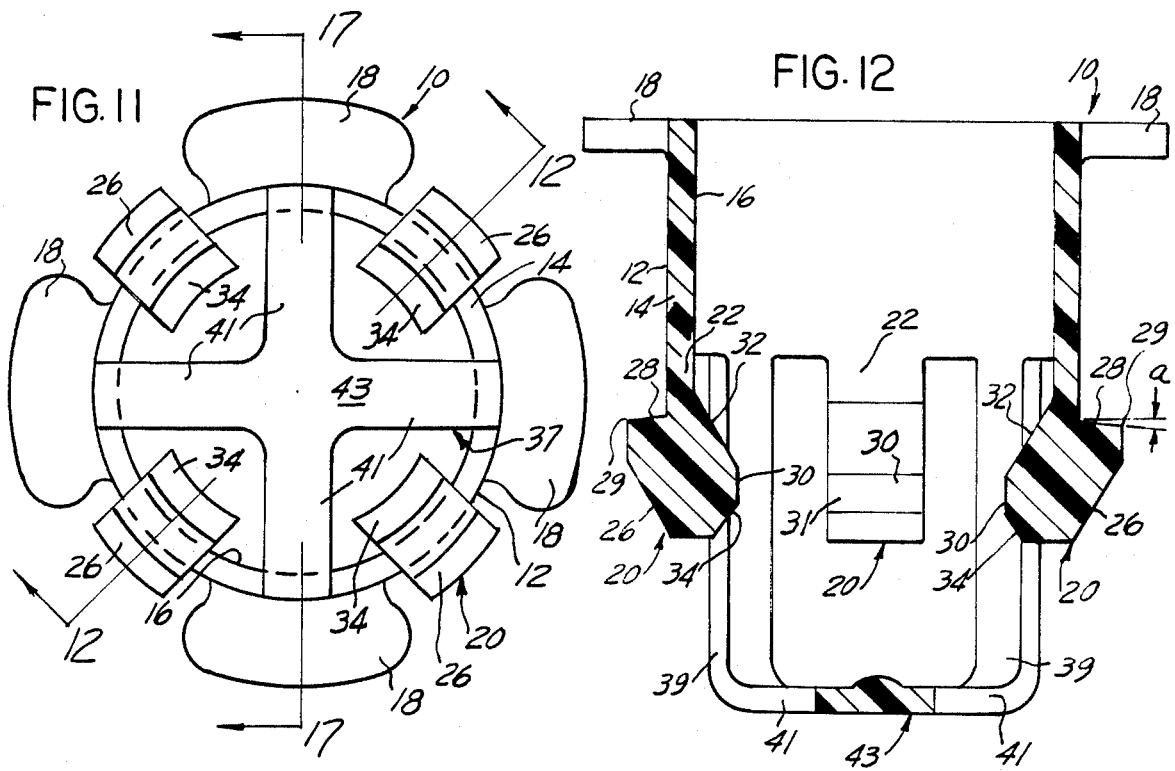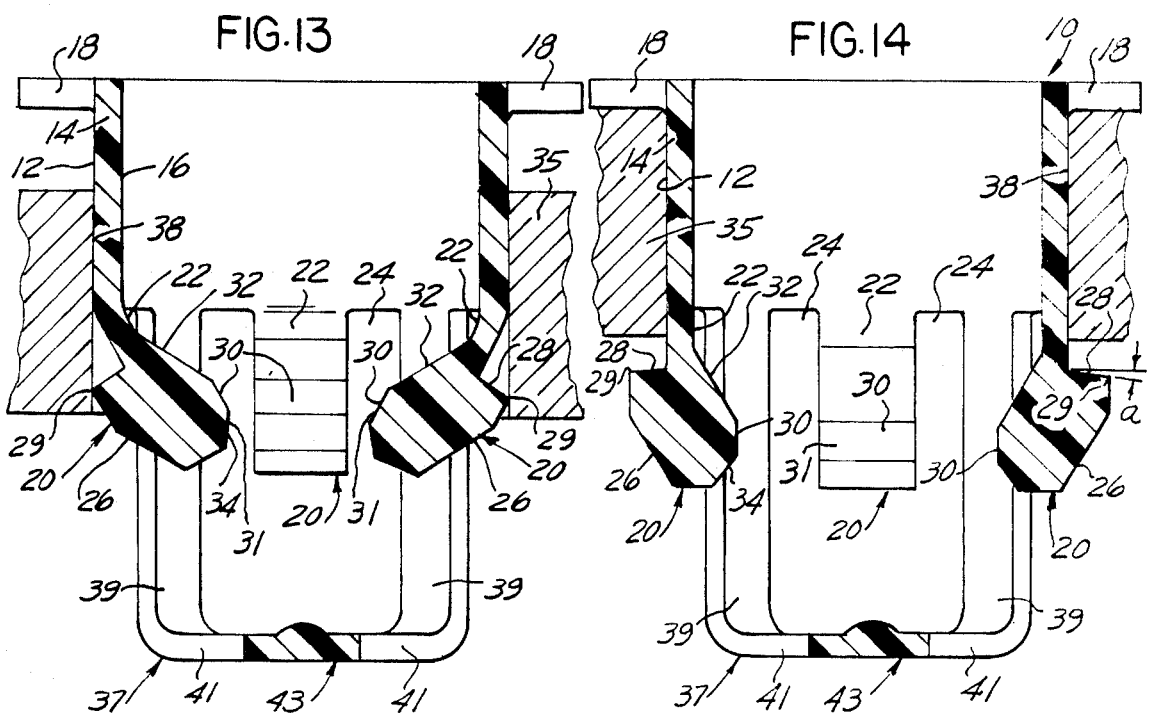

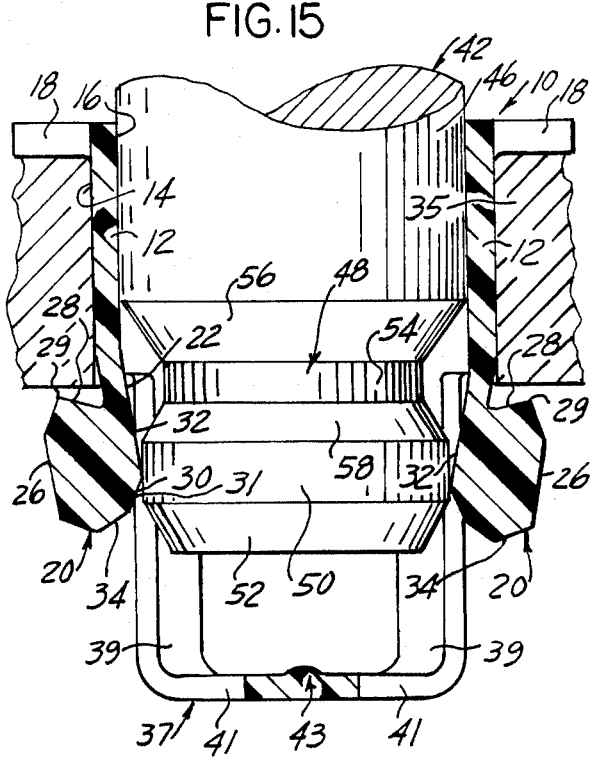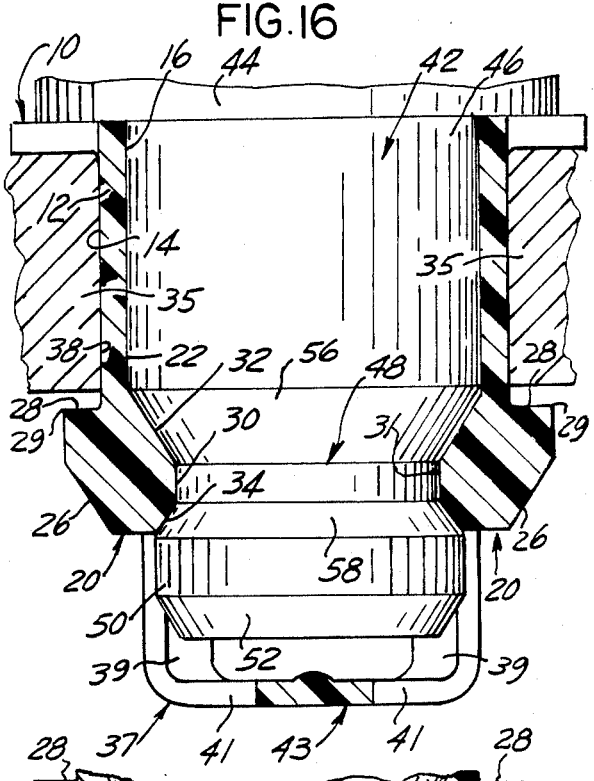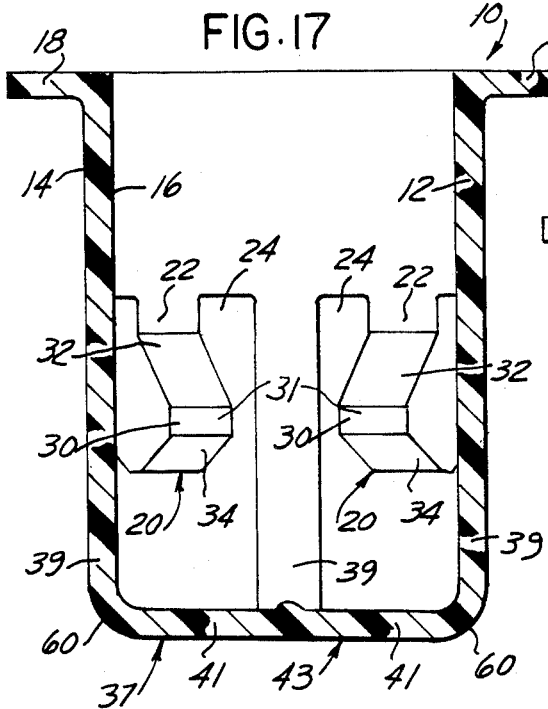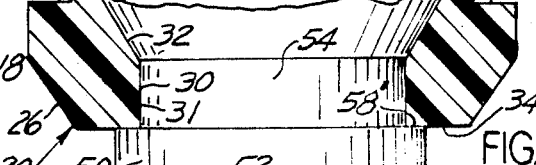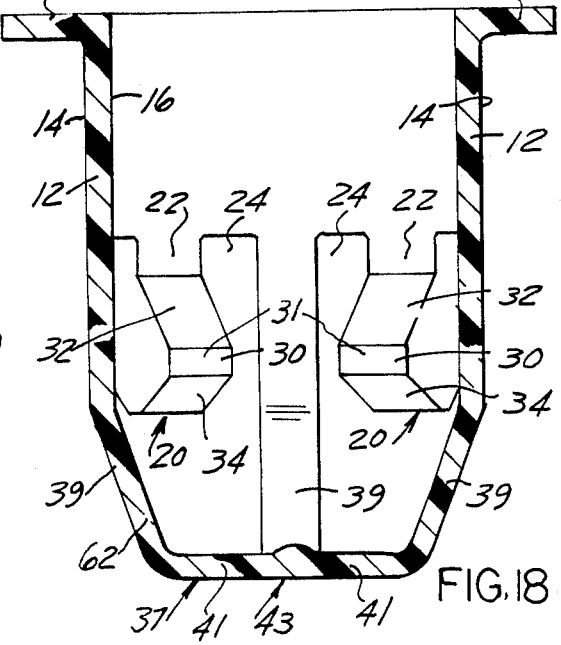

RETAINER BUSHING

CROSS REFERENCE TO RELATED APPLICATIONS

The present application is a continuation-in-part of application Ser. No. 764,241, now U.S. Pat. No. 4624585 filed Aug. 9, 1985, which in turn is a continuation of application Ser. No. 578,709, filed Feb. 9, 1984, now abandoned, both assigned to the same assignee as the present application.

BACKGROUND OF THE INVENTION

The present invention relates to retainers in general and more particularly to a retainer bushing disposed between a male member such as a shaft, rod or pin passed through a bore in a plate, for example, and holding the shaft, rod or pin in pivotal assembly in the bore.

There are many mechanical assemblies wherein a pin, rod or stubshaft is, pivotably or fixedly, attached to a plate, to an arm member, or to a pushrod end by being passed thrrough a bore through the plate, arm member, or pushrod end, and being retained therein by a cotter pin installed in a transverse bore drilled through the end of the pin, rod or stubshaft, or by means of a spring clip engaged in a groove or other retainer member. An example of such mechanical assemblies is the pivotable coupling between a motor vehicle clutch pedal and the input member or pushrod of a hydraulic master cylinder forming part of a clutch hydraulic control apparatus.

The invention disclosed in co-pending application Ser. No. 764,241 now U.S. Pat. No. 4,624,585 presents the advantage over the prior art that it permits to assemble a male member such as a shaft, rod or pin to a plate, an arm member, or a pushrod end, for example, by simply pushing the end of the shaft, rod or pin into the bore of the retainer bushing pre-installed in the bore of a plate, arm member or pushrod end, without requiring the use of special tools or any additional fasteners.

SUMMARY OF THE INVENTION

The principal object of the present invention is also to provide a self-restraining snap-on retainer bushing pre-installed in the bore of a plate or arm member, the bushing being provided with a bore adapted to receive therethrough a male member such as a pin, rod, or shaft, the bushing being further provided with outwardly directed abutting and retaining elements which are elastically displaced during introduction of the bushing into the bore and automatically spring back to their original position to hold the bushing in the bore, and with inwardly directed abutting and retaining elements which are elastically displaced during introduction of the end of the pin, rod or shaft through the bushing and which automatically spring back to their original position into a groove formed at the end of the pin, rod or shaft such as to prevent removal of the pin, rod or shaft from within the bushing. In addition, the invention has means preventing introducing the pin, rod or shaft into the wrong end of the bushing, which would defeat the snap-on retaining features of the bushing.

The invention has particular applications and advantages for effecting a rapid and secure coupling between the eye end of a linear actuator such as the pushrod of a hydraulic master cylinder or slave cylinder, respectively with an actuating or actuated component. As an example of application, the present invention provides a one-way snap-on pivotable fit between the eye end of the master cylinder pushrod and a control member such as a clutch control pedal, with prevention of wrong assembly.

The many objects and advantages of the present invention will become apparent to those skilled in the art when the following description of the best mode contemplated for practicing the invention is read in conjunction with the accompanying drawing wherein like reference numerals refer to like or equivalent parts and in which:

BRIEF DESCRIPTION OF THE DRAWING

FIG. 1 is a side elevation view of a retainer bushing according to the present invention;

FIG. 2 is an end view thereof from line 2—2 of FIG. 1;

FIG. 3 is an end view thereof from line 3—3 of FIG. 1;

FIG. 4 is a section along line 4—4 of FIG. 3;

FIG. 5 is a view similar to FIG. 4 but showing the retainer bushing of the present invention in the process of being introduced into a bore in a mechanical part, such as the bore in the eye end of a linear actuator or pushrod;

FIG. 6 is an exploded view illustrating, in section, the retainer bushing in position and, in elevation, a pin adapted for introduction through the bushing for coupling of the pin with the mechanical part provided with the bore;

FIG. 11 is a bottom view of a further modification of the invention;

FIG. 12 is a longitudinal section thereof along line 12—12 of FIG. 11;

FIG. 13–16 are views similar to FIGS. 5–8, but illustrating the installation in progressive steps, of the bushing of FIGS. 11–12 for coupling a female member to a male member;

FIG. 16a is a partial view similar to FIG. 16, but showing a modification;

FIG. 17 is a longitudinal section of the bushing of FIGS. 11–16 along line 17-17 of FIG. 11; and FIG. 18 is a view similar to FIG. 17, but showing a modification thereof.

DETAILED DESCRIPTION OF THE PREFERRED EMBODIMENTS

Figure 7:
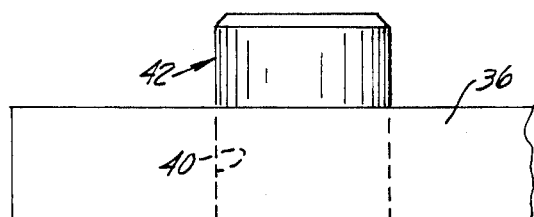
FIG. 7 is a view similar to FIG. 6, but showing the pin partially introduced into the bushing.

Referring to the drawing, and more particularly to FIGS. 1-4 thereof, an example of structure for a retainer bushing 10, according to the present invention, comprises a cylindrical tubular body 12 having a cylindrical peripheral surface 14 of predetermined outer diameter and an interior cylindrical surface forming a bore 16 of predetermined inner diameter. A flange 18 is integrally formed at one end of the cylindrical tubular body 12. The flange 18, in the example of structure illustrated, and as best shown at FIGS. 2 and 3, comprises three separate outwardly radially extending sections disposed in a single plane substantially perpendicular to the axis of the tubular body 12. The other end of the bushing cylindrical tubular body 12 is provided with, in the example of structure illustrated, three longitudinally extending fingers or tangs 20 flexibly deflectable relative to the tubular body 12. Each flexibly deflectable tang 20 has a foot portion 22 integral with the wall of the cylindrical tubular body 12, a pair of notches 24 extending longitudinally part of the way from the edge of the tubular body 12, such as to enable each tang 20 to elastically deflect from its foot portion 22. The exterior surface of each tang 20 has an outwardly projecting inclined ramp surface 26 ending in an outwardly extending abutment surface 28, the junction between the ramp surface 26 and the abutment surface 28 forming a tip 29. Each tang 20 is also provided with an inwardly extending retainer abutment prong 30 preferably ending with a ramp surface 32 proximate its tip 34. The abutment surface 28 and the top surface of the retainer prong 30 are radially extending, outwardly and inwardly, respectively, substantially in a single first plane and in a single second plane, the first and the second planes being substantially co-planar and perpendicular to the axis of the bushing cylindrical tubular body 12, in the example of structure illustrated.

An integral cage-like enclosure 37 is disposed projecting from the same end of the tubular body 12 from which project the tangs 20. The cage-like enclosure 37 comprises legs 39 each having an interior surface conforming to the internal surface of the bore 16 in the tubular body 12 and disposed flush therewith, and a partial cylindrical peripheral surface forming a projection of the peripheral surface 14 of the bushing tubular body 12. The foot of each leg 39 is disposed between two consecutive notches 24, and the end of each leg 39 is provided with an inwardly projecting spoke-like cross-member or wall 41. In the structure illustrated, there are three converging spoke-like walls 41 integrally joined at their joining ends such that the bushing 10 is molded with a closure wall 43 at one end preventing introduction of the male member into the bushing bore 16, except from the end of the cylindrical tubular body 12 provided with the flange 18.

Although the retainer bushing 10 may be made of any convenient resilient material such as spring steel, preferably it is molded in a single piece from an appropriate plastic material such as, for example, acetal resin or nylon such as the resin marketed by Du Pont de Nemours & Co. under the trademark DELRIN.

The retainer bushing 10 is particularly useful for providing a snap-together assembly or coupling between a mechanical element having a bore accepting therein the retainer bushing 10 for connection to another mechanical element provided with a projecting male member such as a pin, rod or shaft, the end of which is adapted to be passed through the open end of the internal bore 16 of the retainer bushing 10. An example of such an assembly is the connection between a motor vehicle clutch release pedal and the pushrod of a hydraulic master cylinder capable of remotely operating the motor vehicle clutch release mechanism by way of a hydraulic slave cylinder hydraulically interconnected to the master cylinder, as, for example, disclosed in detail in U.S. Pat. No. 4,407,125, assigned to the same assignee as the present application.

Figure 8:
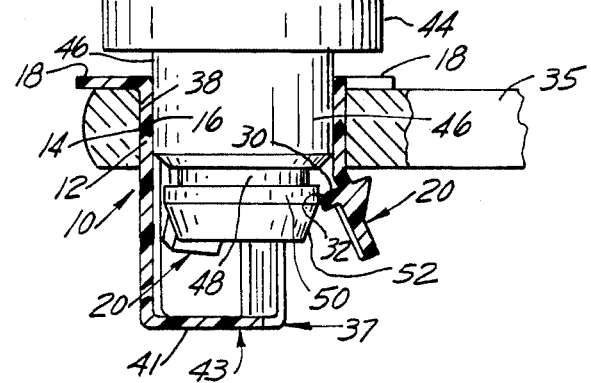
FIG. 8 is a view similar to FIG. 7, but showing the full assembly.
Figure 8:
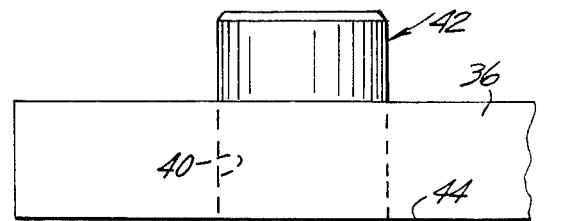

The master cylinder, not shown, is provided with a pushrod 35, FIGS. 5-8, which is coupled to a clutch control foot-operated pedal arm 36, FIGS. 6-8. For that purpose, the end of the master cylinder pushrod 35 is enlarged and provided with an eye in the form of a bore 38 in which a retainer bushing 10, according to the present invention, is pre-installed, simply by pressing into the bore 38, as shown at FIG. 5. During pressing of the retainer bushing 10 into the bore 38, the enclosure legs 39 act as alignment pilot members and each tang 20 is progressively deflected elastically inwardly, as a result of the outer ramp surface 26 of each tang 20 engaging the inlet edge of the bore 38 and deflecting each tang 20, as illustrated at FIG. 5, from its foot portion 22 between the bottom of the notches 24, such that the peripheral tip 29 of the abutment surface 28 rides along the surface of the inner bore 28 of the eye end of the pushrod 35. As soon as the outer tip 29 of each abutment surface 28 is pushed beyond the end of the bore 38, the tangs 20 spring back to their original position, with the result that the retainer bushing 10 is held in the bore 38 with the peripheral surface 14 of its cylindrical body 12 engaged with the inner surface of the bore 38. The flange 18 and the abutment surfaces 28, disposed each at an end of the cylindrical tubular body portion 12, prevent the retainer bushing 10 from being disengaged from within the bore 38, FIG. 6.

The clutch pedal arm 36 has a bore 40 in which is fitted an end of a pin 42 retained by any convenient means such as by press fitting, welding, setscrews or the like. The other end of the pin 42, projecting from the clutch pedal arm 36, has an enlarged shoulder portion 44 defining a spacer between the pedal arm 36 and the master cylinder pushrod 35. The main body portion 46 of the pin 42 has a diameter fitting the inner diameter of the bore 16 in the tubular body 12 of the retainer bushing 10, and a peripheral groove 48 proximate its end 50. The end 50 of the pin main body portion 46 is preferably of slightly reduced diameter as compared to the diameter of the pin main body portion 46, and terminates in a frusto-conical or tapered edge portion 52.

For assembling the master cylinder pushrod 35 to the clutch pedal pin 42, on the motor vehicle assembly line, all that is required is to manually press the pushrod 35, provided at its eye end with the retainer bushing 10 disposed in the bore 38, over the main body portion 46 of the pin 42, as illustrated at FIG. 7 with the end 50 of the pin 42 introduced into the bore 16 of the tubular body 12 at the end of the bushing 10 provided with the flange 18. The inclined ramp portion 32 of the inwardly projecting retainer prong 30 of each tang 20 rides on the tapered end surface 52 of the pin 42 such as to deflect the tang 20 outwardly, FIG. 7, until the tip 34 of each inwardly projecting retainer prong 30 falls into the groove 48 of the pin 42 and allows each tang 20 to spring back to its original position. Thus, with each retainer prong 30 engaged in the pin groove 48, the main body portion 46 of the pin 42 is prevented from being pulled back from the bore 16 of the retainer bushing 10, the retainer bushing 10 being in turn prevented from escaping from the pushrod eye end bore 38 by the interferring abutment surfaces 28 of each tang 20, FIG. 8.

While the main body portion 46 of the pin 42 is pushed through the bore 16 of the retainer bushing cylindrical tubular body portion 12, the flange 18 prevents the retainer bushing from being pushed through, and the cage or enclosure 37 prevents the pin 42 from being introduced into the bore 16 from the wrong end, for example in the course of a blind assembly operation in which the workman must effectuate the coupling of a master cylinder pushrod 35 with a clutch pedal arm 36 strictly by feel. Once the assembly is completed, if it is desired to eliminate the lateral play due to the distance separating the lower face of the flange 18 from the exteriorly extending tang abutment surfaces 28, an elastomeric O-ring or garter spring, as shown at 54 at FIG. 8, may be installed between the abutment surfaces 28 and the lateral surface of the pushrod 35 at its eye end.

Figure 9:
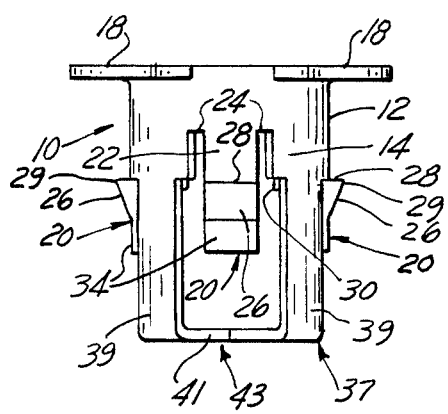
FIGS. 9 and 10 are views similar to FIGS. 1 and 2, but showing a modification of the invention.
Figure 10:
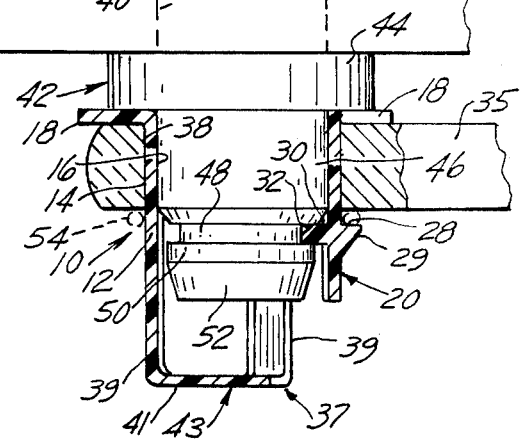
Figure 10:
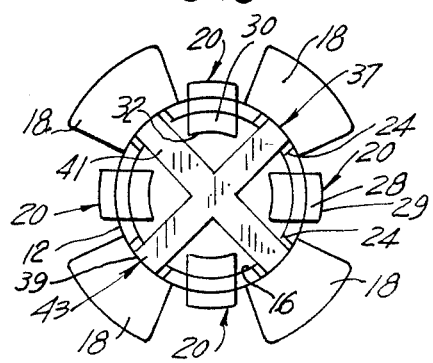

Although the retainer bushing 10 of the present invention has been described and illustrated as provided with an end flange 18 in three segments and with three tangs 20, it will be readily apparent to those skilled in the art that the flange 18 may be made in the form of a full radially outwardly projecting annular portion, or may be made in two, three, four or more sections and that the tangs 20 may be two in number, or four or more. Such an arrangement is illustrated at FIGS. 9-10 illustrating a retainer bushing 10 according to the present invention, provided with four tangs 20 and with a four-legged cage or enclosure 37. In addition, as best shown at FIG. 9, the slots or notches 24, one on each side of the foot 22 of the tangs 20, extend longitudinally further toward the flange 18 than in the structure of FIGS. 1-9. For some applications, providing slots or notches 24 which are longer than heretofore described presents the advantage of offerring more space for the accumulation of dirt that may be present in the ambient and that may cause scratching and undue wear of the bushing surfaces and of the pin and bore surfaces.

Referring now to FIGS. 11-18, a further structural example of retainer bushing 10, according to the present invention, is illustrated as also comprising a cylindrical tubular body 12 having a cylindrical peripheral surface 14 of predetermined outer diameter, and an interior cylindrical surface forming a bore 16 of predetermined inner diameter. A flange 18 is integrally formed at one end of the cylindrical tubular body 12. The flange 18, in the example of structure illustrated, and as best shown at FIG. 11, comprises four separate outwardly radially extending sections disposed in a single plane substantially perpendicular to the axis of the tubular body 12. The other end of the bushing cylindrical tubular body 12 is provided with, in the example of structure illustrated, four longitudinally extending fingers or tangs 20 flexibly deflectable relative to the tubular body 12. Each flexibly deflectable tang 20 has a foot portion 22 integral with the wall of the cylindrical tubular body 12. The exterior surface of each tang 20 has an outwardly projecting inclined ramp surface 26 ending in an outwardly extending abutment surface 28, the junction between the ramp surface 26 and the abutment surface 28 forming a tip 29. Each tang 20 is also provided with an inwardly extending retainer abutment prong 30 having an intermediary surface 31 preceded by a ramp surface 32 and terminating in an abutment inclined surface 34. The plane of the abutment surface 28 is disposed at an angle a to an imaginary plane orthogonal to the longitudinal axis of the cylindrical tubular body 12. Preferably, the angle a is at least 5°.

An integral cage-like enclosure 37 is disposed projecting from the same end of the tubular body 12 from which project the tangs 20. The cage-like enclosure 37 comprises four legs 39 each having an interior surface conforming to the internal surface of the bore 16 in the tubular body 12 and disposed flush therewith, and a partial cylindrical peripheral surface forming a projection of the peripheral surface 14 of the bushing tubular body 12. The legs 39 are separated from the tangs 20 by a relatively wide notch 24. The end of each leg 39 is provided with an inwardly projecting spoke-like crossmember or wall 41. In the structure illustrated, there are four converging spoke-like walls 41 integrally joined at their joining ends such that the bushing 10 is molded also with a closure wall 43 at one end preventing introduction of the male member into the bushing bore 16, except from the end of the cylindrical tubular body 12 provided with the flange 18.

The retainer bushing 10 of FIGS. 11-17 is also particularly useful for providing a snap-together assembly or coupling between a mechanical element having a bore for pivotal connection to another mechanical element provided with a projecting male member such as a pin, rod or shaft. An example of such an assembly, namely the connection between a motor vehicle clutch release pedal and the pushrod of a hydraulic master cylinder is illustrated, in progressive steps, at FIGS. 13-16.

The master cylinder, not shown, is provided with a pushrod 35 provided on one end with an eye in the form of a bore 38 in which the retainer bushing 10 is preinstalled, simply by pressing into the bore 38, as shown at FIG. 13. During pressing of the retainer bushing 10 into the bore 38, the enclosure legs 39 act as alignment pilot members and each tang 20 is progressively deflected elastically inwardly, as a result of the outer ramp surface 26 of each tang 20 engaging the inlet edge of the bore 34 and deflecting each tang 20 inwardly, as illustrated at FIG. 13, the peripheral tip 29 of the abutment surface 28 riding along the surface of the inner bore 38 of the eye end of the pushrod 35. As soon as the outer tip 20 of each abutment surface 28 is pushed beyond the end of the bore 38, the tangs 20 spring back to their original position, with the result that the retainer bushing 10 is held in the bore 38 with the peripheral surface 14 of its cylindrical body 12 engaged with the inner surface of the bore 38. The flange 18 and the abutment surfaces 28, disposed each at an end of the cylindrical tubular body portion 12, prevent the retainer bushing 10 from being disengaged from within the bore 38, FIG. 14.

The clutch pedal arm, not shown, is provided with a projecting pin 42 retained by any convenient means such as by press fitting, welding, setscrews or the like. The pin 42, projecting from the clutch pedal arm, has an enlarged shoulder portion 44 defining a spacer between the pedal arm and the pushrod 35. The main body portion 46 of the pin 42 has a diameter fitting the inner diameter of the bore 16 in the tubular body 12 of the retainer bushing 10, and a peripheral groove 48 proximate its end 50. The end 50 of the pin main body portion 46 is preferably of slightly reduced diameter as compared to the diameter of the pin main body portion 46, and terminates in a frusto-conical or tapered edge portion 52.

The pin peripheral groove 48 is substantially V shaped, being provided with a cylindrical bottom wall 54 and frusto-conical opposite sidewalls 56 and 58.

During assembly on the motor vehicle assembly line of the master cylinder pushrod 35 to the clutch pedal pin 42, all that is required is to manually press the pushrod 35, provided at its eye end with the retainer bushing 10 disposed in the bore 38, over the main body portion 46 of the pin 42, as illustrated at FIG. 15, with the end 50 of the pin 42 introduced into the bore 16 of the tubular body 12 at the end of the bushing 10 provided with the flange 18. The inclined ramp portion 32 of the inwardly projecting retainer prong 30 of each tang 20 rides on the tapered end surface 52 of the pin 42 such as to deflect the tang 20 outwardly, FIG. 15, until each inwardly projecting retainer prong 30 falls into the groove 48 of the pin 42 and allows each tang 20 to spring back to its original position. In the enlarged position of the retainer prongs 30, the intermediary surface 31 of each prong 30 normally clears the bottom 54 of the pin groove 48, while the inclined abutment surface 34 engages the groove sidewall 58 and the ramp surface 32 engages the groove sidewall 56. Thus, with each retainer prong 30 engaged in the pin groove 48, the main body portion 46 of the pin 42 is prevented from being pulled back from the bore 16 of the retainer bushing 10, the retainer bushing 10 being in turn prevented from escaping from the pushrod eye end bore 38 by the interferring abutment surfaces 28 of each tang 20, FIG. 8.

While the main body portion 46 of the pin 42 is pushed through the bore 16 of the retainer bushing cylindrical tubular body portion 12, the flange 18 prevents the retainer bushing from being pushed through, and the cage or enclosure 37 prevents the pin 42 from being introduced into the bore 16 from the wrong end, for example in the course of a blind assembly operation in which the workman must effectuate the coupling of a master cylinder pushrod 35 with a clutch pedal arm strictly by feel. Once the assembly is completed, if it is desired to eliminate the lateral play due to the distance separating the lower face of the flange 18 from the exteriorly extending tang abutment surfaces 28, an elastomeric O-ring or garter spring may be installed between the abutment surfaces 28 and the lateral surface of the pushrod 35 at its eye end.

One advantage resulting from the abutment surfaces 28 being disposed at an angle a of 5° or more to the longitudinal axis of the tubular body 12 is to provide wider clearance between the tip 29 and the side surface of the rod 35 when the pin 42 is pushed into the bore 16 of the retainer bushing 10, FIG. 15. One advantage resulting from the prong inclined abutment surface 34 engaging the pin groove frusto conical sidewall 58, is that the pin 42 and the pushrod 35 may be disassembled without tools by a relatively strong pull being exerted on the assembled parts tending to disengage the pins 42 from within the bore 16 of the retainer bushing 10. Conversely, if it is desired to provide a one-way assembly, the abutment surface of the prong 30 is formed at the tip of the tang 20, as shown at 34' at FIG. 16a, substantially in a plane orthogonal to the longitudinal axis of the tubular body 12, and the internal surface 31 of the prong 30 is prolonged such as to intersect the abutment surface 34' substantially at a right angle. Such a modification, coupled with forming the sidewall 58 of the groove 48 also along a plane perpendicular to the axis of the tubular body 12, provides positive holding of the pin 42 in the retainer bushing 10.

In addition to preventing the pin 42 from being engaged into the retainer bushing 10 from the wrong end, the cage or enclosure 37, and its legs 39, act, as previously mentioned, as a pilot for phrasing the retainer bushing 10 into the bore 38 of the female member, such as the eye of the pushrods 35. As a further aid to its piloting function, the cage or enclosure 37 is preferably provided with a radiused edge 60 at the junction between the end of the legs 39 and the transverse wall 43, FIG. 17, or, in the alternative, with tapered or converging leg ends 62, as shown at FIG. 18.

Having thus described the invention by way of examples of structure well designed to accomplish the objects of the invention, modifications whereof will be apparent to those skilled in the art,

What is claimed as new is as follows:

1. A retainer bushing for holding a male member within a female member bore, said male member having a peripheral groove proximate an end thereof and said bushing comprising a cylindrical tubular body having a cylindrical side wall defining a cylindrical outer periphery fitting said female member bore and an internal cylindrical bore accepting said male member, said tubular body being open at its upper end to allow the entry of said male member thereinto and having a closure end wall at its lower end to preclude the entry of said male member thereinto, a radially extending outwardly directed flange at said open upper end of said tubular body for engagement with a surface of said female member at the upper end of said female member bore, a plurality of circumferentially spaced axially extending openings formed in the cylindrical side wall of said tubular body, each opening extending downwardly from a predetermined location spaced downwardly from said open upper end of said tubular body to a location proximate the closed lower end of said tubular body, said openings defining a plurality of circumferentially spaced axially extending legs therebetween extending downwardly from said predetermined location to a location proximate the closed lower end of said tubular body, a flexible tang positioned in each opening with its upper end integral with said cylindrical side wall and extending downwardly therefrom into the respective opening, each tang having a radially extending outwardly directed abutment surface at a location thereon spaced downwardly from its upper end for engaging the lower end of said female member bore and a radially extending inwardly directed prong, whereby said bushing is installed in said bore with said tang elatically deflected inwardly, said tang being allowed to spring back to its original position whereby said bushing is held in said female member bore by said radially extending abutment surface, said tang being adapted to be outwardly deflectable for introduction of said male member into the bore of said tubular body for engagement of said prong within said peripheral groove in said male member, said cylindrical side wall piloting said bushing into said bore and said male member being prevented by said closure end wall from being introduced into said tubular body at said lower end of said tubular body.

2. The retainer bushing of claim 1 wherein the bore of said tubular body and said male member are circularly cylindrical and define a pivotal connection.

3. The retainer bushing of claim 1 wherein said tang has an outward ramp surface causing deflection of said tang upon introduction of said bushing in said female member bore.

4. The retainer bushing of claim 1 wherein said male member has a tapered end forming a ramp between said end and said peripheral groove for progressively deflecting outwardly said prong-provided tang during introduction of said male member within said bore of said tubular body.

5. The retainer bushing of claim 1 wherein said closure end wall comprises a spoke-like structure formed by radially inward extensions of the lower ends of said legs.

6. An assembly for pivotally coupling a first element having a cylindrical bore to a second element having a cylindrical male member, said cylindrical male member having a peripheral groove, said assembly comprising a retainer bushing for holding said second element male member within said first element bore, said retainer bushing comprising a tubular body having a periphery fitting said first element bore and a cylindrical internal bore accepting said second element male member, said cylindrical internal bore having a longitudinal axis, a radially extending outwardly directed circular flange integrally formed at one end of said tubular body for engaging a surface of said first element at an end of said first element bore, said tubular body being selectively cut away to define at least two flexible tangs formed integrally at one end thereof with said tubular body and extending longitudinally of said body away from said one end of said tubular body to a free end spaced from the other end of said tubular body, each of said flexible tangs having a radially extending outwardly directed abutment surface for engaging a surface of said first element at the other end of said first element bore and an inwardly radially extending prong, the longitudinal portions of said tubular body between said tangs forming legs each extending longitudinally of said tubular body to said other end of said tubular body between consecutive ones of said flexible tangs, and a radially extending cross member at said other end of said tubular body integrally joining the ends of said legs beyond the free ends of said tangs, each of said tangs having an outward ramp surface causing deflection of each of said tangs upon introduction of said bushing in said first element bore, whereby said bushing is installed in said first element bore with said tangs elastically deflected inwardly, said tangs being allowed to spring back to their original position whereby said bushing tubular body portion is held in said first element bore by said tang radially extending abutment surface, said tangs being adapted to be outwardly deflectable for introduction of said second element male member into said bushing internal bore for engagement of the prong of each of said tangs within said peripheral groove in said male member, wherein said second element male member has a tapered portion beyond said peripheral groove forming a ramp for progressively deflecting outwardly said tangs by engagement with the prong of each of said tangs during introduction of said male member within said bushing bore, and said cross member prevents said second element male member from being introduced within said bushing bore from the end of said tubular body provided with said cross member.

7. The assembly of claim 4 wherein said legs define a pilot portion for said bushing aiding in introducing said bushing in said first element cylindrical bore.

8. The assembly of claim 7 wherein said legs and said cross-member are integrally joined by a radiused portion.

9. The assembly of claim 7 wherein said legs and said cross-member are integrally joined by a tapered portion.

* * * * *

UNITED STATES PATENT AND TRADEMARK OFFICE
CERTIFICATE OF CORRECTION

PATENT NO. : 4,750,878

DATED : June 14, 1988

INVENTOR(S) : Richard A. Nix, et al.

It is certified that error appears in the above-identified patent and that said Letters Patent is hereby corrected as shown below:

The term of this patent subsequent to November 25, 2003, has been disclaimed.

Signed and Sealed this

Sixth Day of December, 1988

*Attest:*

DONALD J. QUIGG

*Attesting Officer*  *Commissioner of Patents and Trademarks*